(12) United States Patent
Lee et al.

(10) Patent No.: US 9,176,830 B2
(45) Date of Patent: Nov. 3, 2015

(54) METHOD FOR DETERMINING SOFTWARE ERROR IN VIRTUALIZATION BASED INTEGRATED CONTROL SYSTEM

(71) Applicants: Hyundai Motor Company, Seoul (KR); Korea University Research and Business Foundation, Seoul (KR)

(72) Inventors: Hyun Woo Lee, Seoul (KR); Young Woo Park, Yongin-si (KR); Min Hyuk Oh, Yongin-si (KR); Hae Young Kwon, Suwon-si (KR); Se Won Kim, Seoul (KR); Hyuck Yoo, Seoul (KR)

(73) Assignees: HYUNDAI MOTOR COMPANY, Seoul (KR); KOREA UNIVERSITY RESEARCH AND BUSINESS FOUNDATION, Seoul (KR)

( * ) Notice: Subject to any disclaimer, the term of this patent is extended or adjusted under 35 U.S.C. 154(b) by 126 days.

(21) Appl. No.: 14/070,314

(22) Filed: Nov. 1, 2013

(65) Prior Publication Data

US 2014/0351652 A1 Nov. 27, 2014

(30) Foreign Application Priority Data

May 24, 2013 (KR) ........................ 10-2013-0059093

(51) Int. Cl.
*G06F 11/00* (2006.01)
*G06F 11/14* (2006.01)
*G06F 11/07* (2006.01)

(52) U.S. Cl.
CPC ........ *G06F 11/1484* (2013.01); *G06F 11/0712* (2013.01); *G06F 11/0766* (2013.01)

(58) Field of Classification Search
CPC .......... G06F 11/0757–11/076; G06F 11/1484; G06F 11/0712; G06F 9/45558; G06F 2009/4557
See application file for complete search history.

(56) References Cited

U.S. PATENT DOCUMENTS

| | | | |
|---|---|---|---|
| 2008/0222632 A1* | 9/2008 | Ueno et al. | 718/1 |
| 2012/0030670 A1* | 2/2012 | Vijay et al. | 718/1 |
| 2012/0084602 A1 | 4/2012 | Lee et al. | |
| 2012/0159267 A1* | 6/2012 | Gyorffy | 714/55 |

FOREIGN PATENT DOCUMENTS

| | | |
|---|---|---|
| JP | 2008-217728 A | 9/2008 |
| JP | 2008-292409 A | 12/2008 |
| JP | 2009-116816 A | 5/2009 |
| KR | 10-1027415 B1 | 4/2011 |
| KR | 10-2012-0035081 A | 4/2012 |
| KR | 10-2012-0043375 A | 5/2012 |

\* cited by examiner

*Primary Examiner* — Alford Kindred
*Assistant Examiner* — Jason Bryan
(74) *Attorney, Agent, or Firm* — McDermott Will & Emery LLP

(57) ABSTRACT

A method for determining software errors in a virtualization-based integrated control system detects software errors for each partition (software of a vehicle controller) and recovers automatically. Thus, system reliability, which is an advantage of virtualization techniques, can be further enhanced, thereby providing an operator with stability, and software errors can be easily addressed by writing error information.

6 Claims, 3 Drawing Sheets

METHOD FOR DETERMINING SOFTWARE ERROR IN VIRTUALIZATION BASED INTEGRATED CONTROL SYSTEM

CROSS-REFERENCE TO RELATED APPLICATION

This application claims the benefit of priority to Korean Patent Application No. 10-2013-0059093, filed on May 24, 2013 in the Korean Intellectual Property Office, the disclosure of which is incorporated herein in its entirety by reference.

TECHNICAL FIELD

The present disclosure relates to a method for determining a software error in a virtualization-based integrated control system, and more particularly, to a method for automatically detecting an error occurring in partitioned software in a virtualization-based integrated control system and recovering the system to a normal state.

BACKGROUND

There are schemes for configuring an integrated controller. One scheme is to change a plurality of software logics (code change) suitable for one software platform in a hardware component. Another scheme is to partition a physical micro controller unit (MCU) into multiple virtual MCU using virtualization techniques without changing software platforms and software logic.

In existing virtualization-based integrated controllers, once software in a controller causes an error, the software is no longer able to operate normally.

That is, the existing virtualization-based integrated controllers are not able to detect an error in the controller software, and thus not able to automatically recover after the error occurs.

In particular, the existing virtualization-based integrated controllers are not able to identify which part of the controller software caused the error.

SUMMARY

The present disclosure has been made to solve the above-mentioned problems occurring in the prior art while advantages achieved by the prior art are maintained intact.

According to an embodiment of the present disclosure, a method for determining software errors in a virtualization-based integrated control system detects the software errors for each partition (software of a vehicle controller) and recovers automatically. Thus, system reliability, which is an advantage of virtualization techniques, can be further enhanced, thereby providing an operator with stability, and software errors can be easily addressed by writing error information.

An aspect of the present disclosure provides a method for determining an error in a virtualization-based integrated control system, wherein the system includes a virtualization-based integrated controller virtualizing a physical micro controller unit (MCU) to create a plurality of virtual MCUs, and software type controllers operating on the virtual MCUs. The method includes: delivering a timer interrupt from the virtualization-based integrated controller to the software type controllers; delivering a difference value, which is a difference between a counting value currently read from a timer and a counting value immediately previously read from the timer, from the software type controllers to the virtualization-based integrated controller; and determining, by the virtualization-based integrated controller, whether the error occurred in the software type controllers based on the difference value delivered from the software type controllers.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Hereinafter, embodiments of the present disclosure will be described in detail with reference to the accompanying drawings.

Figure 1:
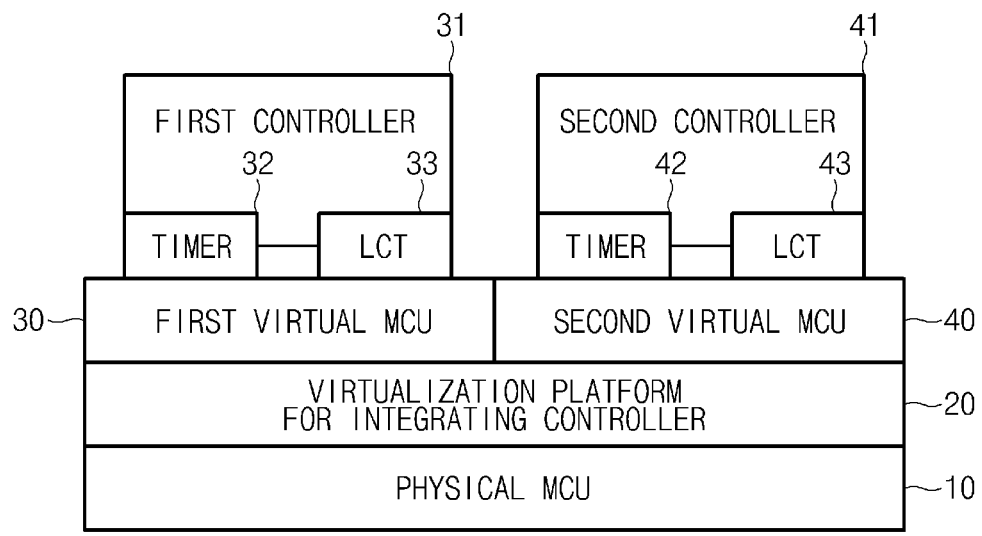
FIG. 1 is a view illustrating the configuration of a virtualization-based integrated control system according to an embodiment of the present disclosure.

FIG. 1 is a view illustrating the configuration of a virtualization-based integrated control system according to an embodiment of the present disclosure.

As shown in FIG. 1, the virtualization-based integrated control system according to an embodiment of the present disclosure virtualizes a physical micro controller unit (MCU) 10 to include a virtualization platform for integrating controllers 20 (hereinafter referred to as virtualization-based integrated controller) that creates a first virtual MCU 30 and a second virtual MCU 40.

A first controller 31 is a software type controller which is driven based on the first virtual MCU 30, and executes a timer function 32 and a liveness check task (LCT) function 33 along with various control functions.

Likewise, a second controller 41 is a software type controller which is driven based on the second virtual MCU 40, and executes a timer function 42 and a LCT function 43 along with the various control functions.

The timer functions 32 and 42 refer to incrementing a counting value by 1 upon receiving a timer interrupt from the virtualization-based integrated controller 20 periodically, e.g., every 10 ms. As an example, the timer may be implemented as a "jiffie" operating on a Linux operating system.

The "jiffie" is a global variable for managing time on software, and increments a "jiffie" value by 1 for every timer interrupt at a regular interval (10 ms). That is, the "jiffi" is known in this country to a person of ordinary skill in the art.

The LCT functions 33 and 43 refer to reading a value counted by the timer functions 32 and 42 at a predetermined interval (e.g., 100 ms) to deliver the value to the virtualization-based integrated controller 20. Since the LCT function is executed together with a task scheduled by a scheduler of the controller, the load of the controller may be estimated based on a difference between the currently read counting value and the immediately previously read counting value (hereinafter, the difference value). Here, the LCT functions 33 and 43 store the currently read counting value and the previously read counting value. For example, under the conditions of the timer interrupt time is 10 ms, the LCT interval is 100 ms, and the immediately previously read counting value is 10, when the LCT function is executed on the set time since there are not many other tasks, the virtualization based integrated controller 20 receives the difference value from the software type controller per 100 ms. That is, because the previously read counting value is 10, and the counting value read on 100 ms is 20, the difference value of 10 is delivered.

Under these conditions, if the LCT function is executed at 110 ms because there are many other tasks, the virtualization based integrated controller 20 receives the difference value 11 because the counting value read from the timer is 21 and the previously read counting value is 10.

Therefore, the virtualization based integrated controller 20 may determine that the software type controller is normally operating if it receives 10, whereas the controller may determine that the software type controller is loaded so that the LCT is not executed on the normal time if it receives 11. Here, an interval, that a result of LCT execution (the difference value) is delivered (delivery interval), is set, so that if the difference value is not delivered after the threshold value (30 ms) of delivery interval has elapsed, it is determined that an error occurred in the software type controller, and a reset signal is sent. That is, the software type controller is rebooted.

In the present disclosure, the physical MCU 10 is configured by hardware, while the virtualization-based integrated controller 20, the first virtual MCU 30, the second virtual MCU 40, the first controller 31, and the second controller 41 are configured by software.

Hereinafter, the configuration of the virtualization-based integrated controller 20 is described with reference to FIG. 2.

Figure 2:
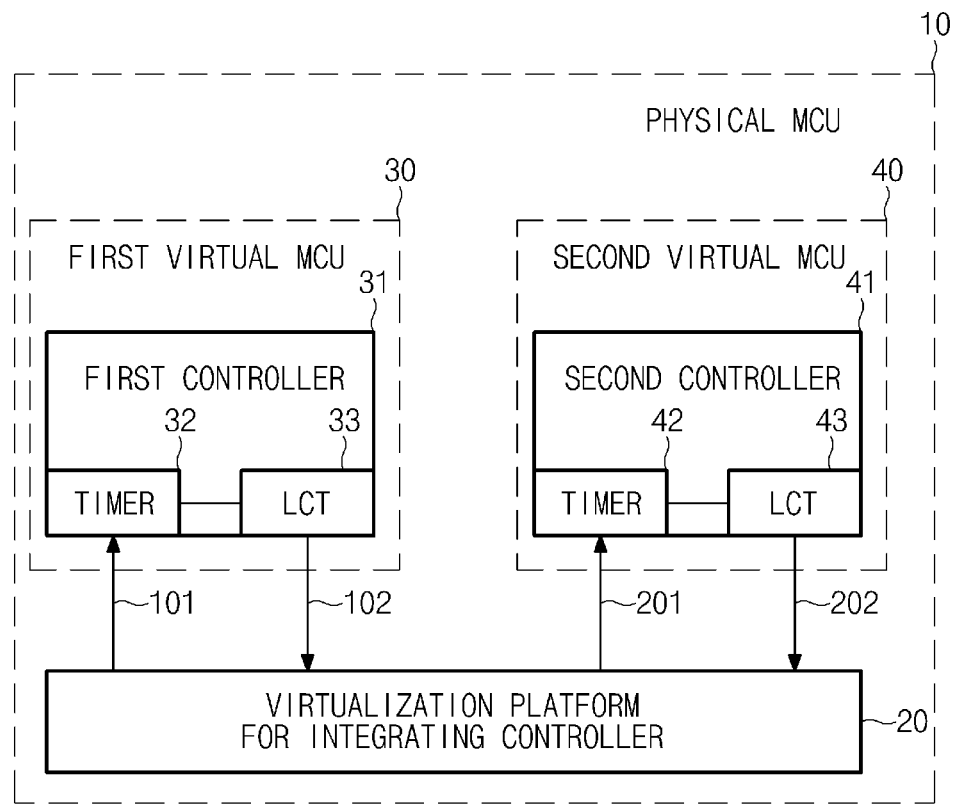
FIG. 2 is a view illustrating the configuration of a virtualization-based integrated control system according to an embodiment of the present disclosure.

FIG. 2 is a view illustrating the configuration of a virtualization-based integrated control system according to an embodiment of the present disclosure.

As shown in FIG. 2, the virtualization-based integrated control system according to an embodiment of the present disclosure includes the physical micro controller unit (MCU) 10, the virtualization platform for integrating controller 20 (hereinafter referred to as a virtualization-based integrated controller), the first virtual MCU 30, and the second virtual MCU 40.

The physical MCU 10 is a physical machine that integrally controls a plurality of the vehicle controllers based on the virtualization techniques. The vehicle controllers are software type controllers 31 and 41 operating on the virtual machines 30 and 40 created by virtualization techniques, which include automotive open system architecture (AUTOSAR), Linux, applications, and the like, and more specifically, cluster logic software, cluster graphical software, and the like.

The virtualization-based integrated controller 20 is a type of virtual machine monitor (virtualization-based integrated controller) for integrating the software type controllers 31 and 41, and supports the software type controllers 31 and 41 so that they are simultaneously operable on the physical MCU 10 based on virtualization techniques. That is, based on the physical MCU 10, the first virtual MCU 30 for the first controller 31, and the second virtual MCU 40 for the second controller 41 are created.

The virtualization-based integrated controller 20 communicates with the software type first controller 31 and the software type second controller 32 via inter-partition communication (IPC).

That is, the virtualization-based integrated controller 20 delivers timer interrupts to the timers 32, 42 via the IPC periodically, e.g., at 10 ms interval (101, 210), and receives the difference value from the LCTs 33, 43 (102, 202). If the virtualization-based integrated controller 20 receives the difference value periodically, e.g., at 100 ms interval, it is determined that the software type controllers 31, 41 normally operate. If the virtualization-based integrated controller 20 receives the difference value within a threshold interval, e.g., 130 ms, it is determined that the software type controllers 31, 41 are loaded. If the virtualization-based integrated controller 20 fails to receive the difference value within the threshold interval, it is determined that an error occurred in the software type controllers 31, 41 so that they are rebooted. Here, 100 ms is a delivery interval and 103 ms is a threshold interval.

Figure 3:
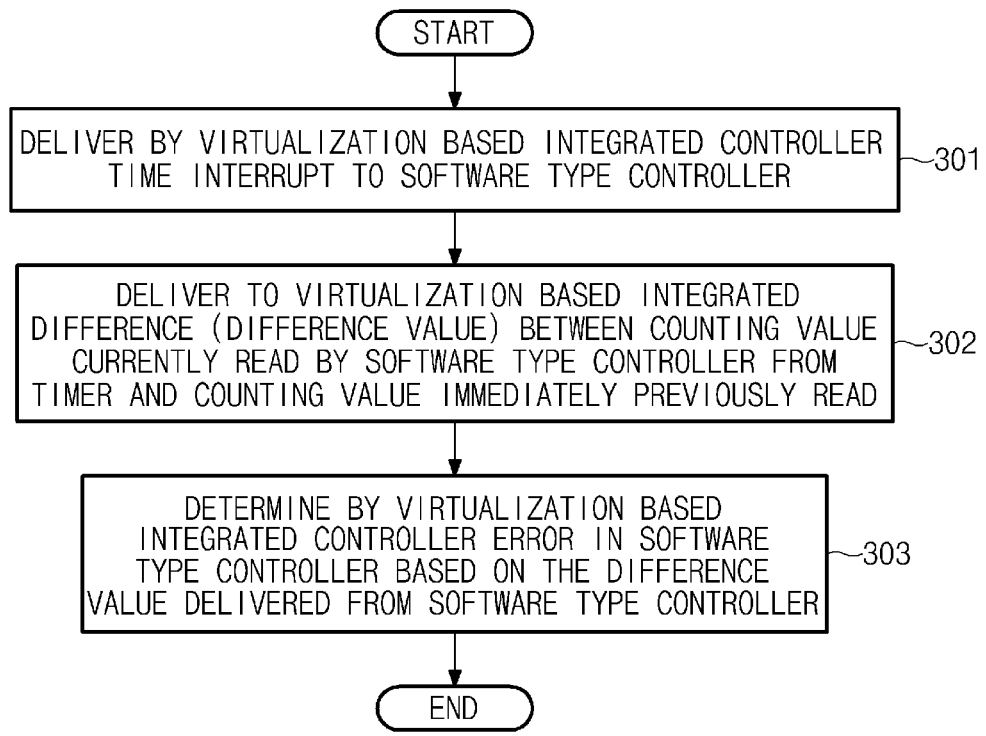
FIG. 3 is a flow chart illustrating a method for determining a software error in a virtualization-based integrated control system according to an embodiment of the present disclosure.

FIG. 3 is a flow chart illustrating a method for determining a software error in a virtualization-based integrated control system according to an embodiment of the present disclosure. The virtualization-based integrated controller 20 delivers the timer interrupt to the software type controllers 31, 41 (301). Then, the software type controllers 31, 41 deliver the difference between currently read counting values and the immediately previously read counting values (hereinafter referred to as the difference value) from the timers 32, 42 to the virtualization-based integrated controller 20 (302).

The virtualization-based integrated controller 20 then determines whether an error has occurred in the software type controllers based on the difference value delivered from the software type controllers 31, 41 (303). That is, the virtualization-based integrated controller 20 determines whether the software type controllers are normally operating when it receives the difference value within the delivery interval for the software type controllers.

The virtualization-based integrated controller 20 determines that the software type controllers are loaded if it receives the difference value within the threshold interval for the software type controllers.

Further, the virtualization-based integrated controller 20 determines that an error has occurred in the software type controllers and reboots the software type controllers if it fails to receive the difference value within the threshold interval for the software type controllers.

As stated forth above, according to the embodiments of the present disclosure, in the integrated controller to which the virtualization techniques are applied, the software errors are detected for each partition and automatically recovered, such that system reliability, which is an advantage of virtualization techniques, can be further enhanced thereby providing an operator with stability, and the software errors can be easily addressed by writing error information.

The present disclosure described above may be variously substituted, altered, and modified by those skilled in the art to which the present disclosure pertains without departing from the scope and sprit of the present disclosure. Therefore, the present disclosure is not limited to the above-mentioned exemplary embodiments and the accompanying drawings.

What is claimed is:

1. A method for determining an error in a virtualization-based integrated control system, wherein the system includes a virtualization-based integrated controller virtualizing a physical micro controller unit (MCU) to create a plurality of virtual MCUs, and software type controllers respectively operating on the virtual MCUs, the method comprising:

delivering a timer interrupt from the virtualization-based integrated controller to each software type controller;

delivering a difference value, which is a difference between a counting value currently read from a timer and a counting value immediately previously read from the timer, from each software type controller to the virtualization-based integrated controller; and determining, by the virtualization-based integrated controller, whether an error occurs in any one of the software type controllers based on the difference value delivered from each software type controller, wherein the virtualization-based integrated controller further determines that any one of the software type controllers is loaded when the delivered difference value from the corresponding software type controller is received within a threshold interval.

2. The method according to claim 1, wherein the virtualization-based integrated controller further determines that each software type operates normally when the delivered difference value from each software type controller is received within a delivery interval.

3. The method according to claim 2, wherein the delivery interval is set differently for each software type controller.

4. The method according to claim 1, wherein the virtualization-based integrated controller determines that the error occurs in any one of software type controllers when the delivered difference value from the corresponding software type controller is not received within the threshold interval and reboots the soft type controller having the error.

5. The method according to claim 1, wherein the threshold interval is set differently for each software type controller.

6. The method according to claim 1, wherein the virtualization-based integrated controller communicates with each software type controller via an inter-partition communication (IPC).

* * * * *